(12) United States Patent
Shinkle et al.

(10) Patent No.: US 9,599,028 B2
(45) Date of Patent: Mar. 21, 2017

(54) BULK FLAME TEMPERATURE REGULATOR FOR DRY LOW EMISSION ENGINES

(71) Applicant: General Electric Company, Schenectady, NY (US)

(72) Inventors: William Randolph Shinkle, Cincinnati, OH (US); James Arthur Simmons, Tampa, FL (US)

(73) Assignee: General Electric Company, Schenectady, NY (US)

( * ) Notice: Subject to any disclaimer, the term of this patent is extended or adjusted under 35 U.S.C. 154(b) by 362 days.

(21) Appl. No.: 14/479,608

(22) Filed: Sep. 8, 2014

(65) Prior Publication Data

US 2016/0069271 A1    Mar. 10, 2016

(51) Int. Cl.
| | |
|---|---|
| *F02C 9/00* | (2006.01) |
| *F02C 9/18* | (2006.01) |
| *F02C 9/28* | (2006.01) |
| *F23N 5/00* | (2006.01) |
| *G01K 13/02* | (2006.01) |

(Continued)

(52) U.S. Cl.
CPC ............. *F02C 9/18* (2013.01); *F02C 9/00* (2013.01); *F02C 9/28* (2013.01); *F23N 1/022* (2013.01); *F23N 5/022* (2013.01); *F23R 3/286* (2013.01); *F23R 3/346* (2013.01); *G01K 13/02* (2013.01); *G01M 15/14* (2013.01);
(Continued)

(58) Field of Classification Search
CPC ...... F02C 9/00; F02C 9/18; F02C 9/28; F02C 9/52; F05D 2270/0831; F05D 2270/083; F05D 2270/303; F05D 2270/31; F05D 2270/082; F23N 5/02; F23N 5/022; F23R 3/26

See application file for complete search history.

(56) References Cited

U.S. PATENT DOCUMENTS 7,302,334 B2 * 11/2007 Hook .................. F02C 9/28
                                                        60/39.27
2009/0222187 A1    9/2009 Martling et al.
(Continued)

OTHER PUBLICATIONS

PCT Search Report and Written Opinion issued in connection with corresponding PCT Application No. PCT/US2015/045595 on Oct. 16, 2015.

*Primary Examiner* — Andrew Nguyen
(74) *Attorney, Agent, or Firm* — Eversheds Sutherland (US) LLP (57) ABSTRACT

Systems and methods for regulating a bulk flame temperature in a dry low emission (DLE) engine are provided. According to one embodiment of the disclosure, a method may include measuring an exhaust gas temperature (EGT) and determining a target EGT. The target EGT is determined based at least in part on a compressor bleed air flow percentage and a combustor burning mode. The method may include calculating a bias based at least in part on the EGT and the target EGT and applying the bias to a bulk flame temperature schedule. The method may include regulating one or more staging valves and compressor bleeds of the DLE engine based at least in part on the bulk flame temperature schedule. The bulk flame temperature schedule is mapped to parameters of the staging valves and compressor bleeds to reduce nitric oxide, nitrogen dioxide, and carbon monoxide emissions.

18 Claims, 4 Drawing Sheets

(51) Int. Cl.
  *G01M 15/14*   (2006.01)
  *F23N 1/02*    (2006.01)
  *F23N 5/02*    (2006.01)
  *F23R 3/28*    (2006.01)
  *F23R 3/34*    (2006.01)

(52) U.S. Cl.
  CPC .. *F05D 2270/082* (2013.01); *F05D 2270/083* (2013.01); *F05D 2270/303* (2013.01)

(56) References Cited

U.S. PATENT DOCUMENTS

2014/0020400 A1   1/2014  Ceccherini et al.
2014/0165581 A1*  6/2014  Terry .................. F02C 9/00
                                                  60/772

\* cited by examiner

BULK FLAME TEMPERATURE REGULATOR FOR DRY LOW EMISSION ENGINES

TECHNICAL FIELD

This disclosure relates generally to controllers for gas turbine engines and, more particularly, to systems and methods for regulating a bulk flame temperature in a dry low emission engine.

BACKGROUND

Dry low emission (DLE) engines may need to maintain nitric oxide and nitrogen dioxide (NOx) and carbon monoxide (CO) emissions below a specific level to satisfy requirements of certain regulating agencies. Failure to maintain the emissions under these limits may result in financial penalties or even force the operator to take a DLE engine out of service. Controllers can modulate staging valves and compressor bleeds of a DLE engine as a function of flame temperature schedules. These flame temperature schedules can be mapped and saved to ensure regulatory requirements for emissions are met.

However, when there are changes in ambient conditions, fuel sources, and/or minor damages in engine components, the flame temperature schedules may not result in an acceptable behavior of a DLE engine. A mismatch of flame temperature schedules and operational conditions may result in combustor flameouts and engine trips.

BRIEF DESCRIPTION OF THE DISCLOSURE

The disclosure relates to systems and methods for regulating bulk flame temperature in dry low emission engines. According to one embodiment of the disclosure, a method is provided. The method may include measuring an exhaust gas temperature (EGT) and determining a target EGT. The method may allow for calculating a bias based at least in part on the EGT and the target EGT, and applying the bias to a bulk flame temperature schedule. In some embodiments, the bias may be applied to the bulk flame temperature schedule when the DLE engine is running in a bleed modulation mode.

In some embodiments, the method may further include regulating one or more staging valves and compressor bleeds of the DLE engine based at least in part on the bulk flame temperature schedule. The bulk flame temperature schedule may be mapped to parameters of one or more staging valves and compressor bleeds to reduce nitric oxide and NOx and CO emissions. In some embodiments, the target EGT can be determined based at least in part on a compressor air flow percentage and a combustor burning mode.

In some embodiments, prior to applying the bias to the bulk flame temperature schedule, a corrected core speed may be measured. The method may continue with comparing the corrected core speed to a core speed target to determine a further bias. The further bias can be determined to prevent the corrected core speed from exceeding the core speed target. The method may proceed with adjusting the bias based at least in part on the further bias. In some embodiments, adjusting the bias may include selecting a minimal value from the bias and the further bias.

In some embodiments, the corrected core speed limit may be determined based at least in part on a combustor burning mode. The method may include determining that the corrected core speed is equal or greater than the core speed target. Based on the determination, the DLE engine may be selectively switched to a lower combustor burning mode.

According to another embodiment of the disclosure, a system for regulating a bulk flame temperature in a DLE engine is provided. The system may include a processor and a memory communicatively coupled to the processor. The memory may be operable to store instructions which when executed by the processor perform various operations. The operations may include measuring an EGT and determining a target EGT. The operations may further include calculating a bias based at least in part on the EGT and the target EGT, and applying the bias to a bulk flame temperature schedule.

In some embodiments, the processor may be operable to control one or more staging valves and compressor bleeds associated with the DLE engine based at least in part on the bulk flame temperature schedule. The bulk flame temperature schedule can be mapped to parameters of the one or more staging valves and compressor bleeds to reduce nitric oxide, NOx, and CO emissions.

In some embodiments, prior to applying the bias to the bulk flame temperature, schedule operations executed by the processor may further measure a corrected core speed. The corrected core speed may be compared to a core speed target to determine a further bias. The further bias can be determined to minimize the occurrence of or to otherwise prevent the corrected core speed from reaching the core speed target. The bias may be adjusted based at least in part on the further bias. In some embodiments, the corrected core speed target may be determined based at least in part on a combustor burning mode.

Other embodiments, features, and aspects will become apparent from the following description taken in conjunction with the following drawings.

DETAILED DESCRIPTION

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments described herein relate to systems and methods for regulating bulk flame temperature in dry low emission (DLE) engines. Certain embodiments may allow for correcting bulk flame temperature schedules when ambient conditions have changed in order to minimize the occurrence of or to otherwise prevent flameouts and engine trips. The following provides the detailed description of various example embodiments related to systems and methods for regulating bulk flame temperature in a DLE engine.

Figure 1:
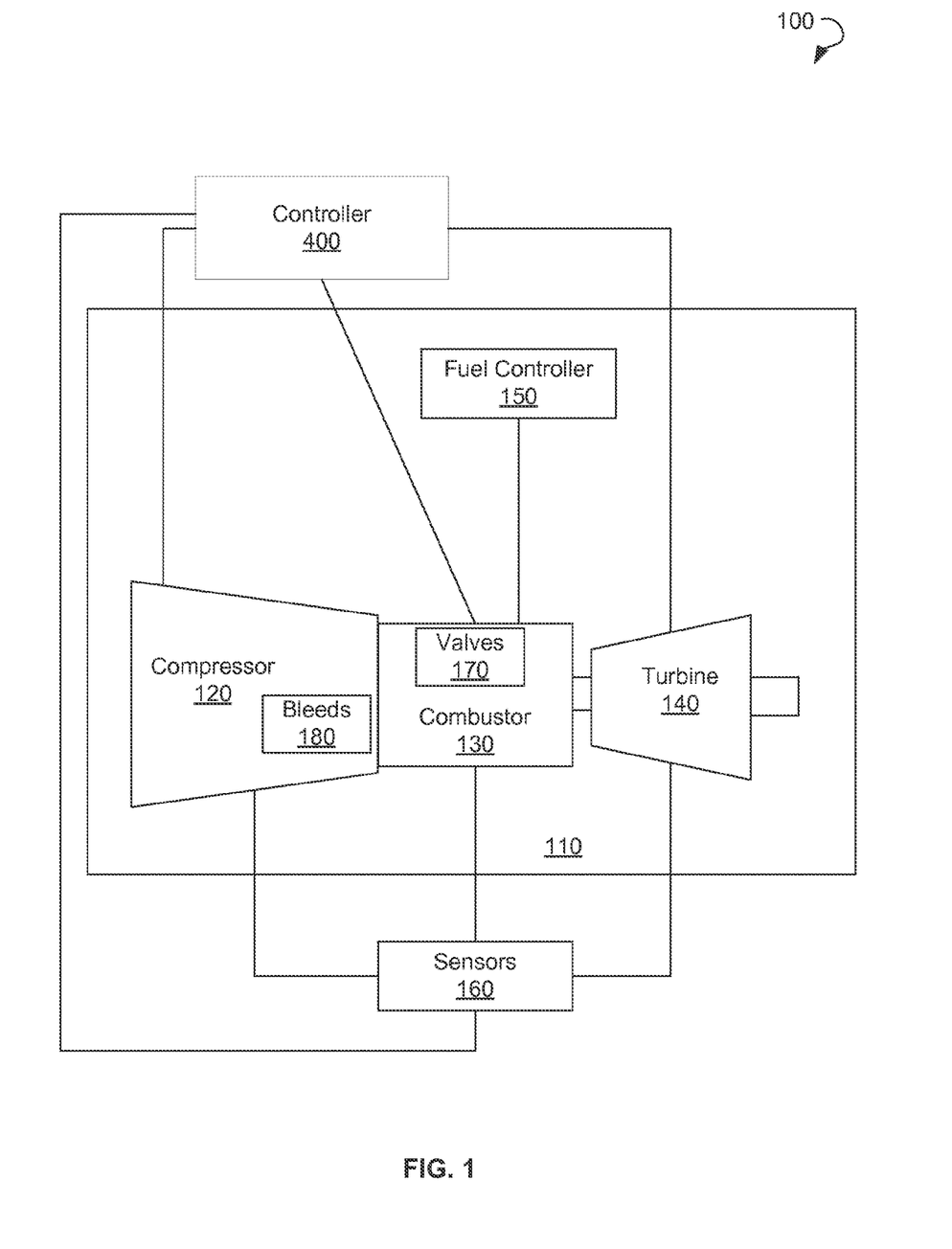
FIG. 1 is a block diagram illustrating an example environment in which methods and systems for regulating bulk flame temperature can be implemented according to embodiments of the disclosure.

Referring now to FIG. 1, a block diagram illustrates an example system environment 100 suitable for implementing systems and methods for regulating bulk flame temperature in a DLE engine, in accordance with one or more example embodiments. In particular, the system environment 100 may include a gas turbine engine 110, which, in turn, may include a compressor 120, a combustor 130, a turbine 140 coupled to the compressor 120, and a controller 400. The engine 110 may drive a generator that produces electrical power and supplies the electrical power via a breaker to an electrical grid.

In some embodiments, the combustor 130 may include lean premixed combustors or ultra-low emission combustors which may use air as a diluent to reduce combustion flame temperatures. Additionally, premixing fuel and air prior to entering the combustor may reduce NOx emissions. An example of ultra-low emission combustor may include a dry low NOx (DLN) combustor.

Gas turbine engines with ultra-low emissions combustors, e.g., DLN combustion systems, may need relatively precise control so that the engine emissions are within limits established by the turbine manufacturer and to ensure that the gas turbine operates within certain operability boundaries (e.g., lean blowout, combustion dynamics, and other parameters). Control systems for ultra-low emission combustors generally require highly accurate and calibrated emission sensors. The compressor 120, combustor 130, and turbine 140 may be coupled to the controller 400. The operation of the engine 110 may be managed by the controller 400. The controller 400 may include a computer system having a processor that executes programs to control the operation of the engine 110 using sensor inputs, transfer function outputs, and instructions from human operators. The controller 400 may include an engine combustion control system and may be configured to manage combustion during turbine operation.

The operation of the engine 110 may require the controller 400 to set total fuel flow, overboard compressor bleed, and combustor fuel splits to achieve a desired cycle match point (e.g., generate a desired output and heat-rate while observing operational boundaries). The total fuel flow, combustor fuel split, and compressor bleed may act as dominant effectors in achieving a desired result. A typical part-load control mode involves setting fuel flow, combustor fuel split, and compressor bleed to satisfy the load (generator output) request, and to observe an exhaust temperature profile (temperature control curve). When the base-load operation is achieved, the compressor bleed is typically at a minimum physical limit. At the base-load, fuel flow alone is generally adjusted to observe an exhaust temperature profile needed to satisfy emission limits and other gas turbine operating limits.

In certain embodiments, the engine 110 may include a fuel controller 150, is shown on FIG. 1. The fuel controller 150 may be configured to regulate the fuel flowing from a fuel supply to the combustor 130. The fuel controller 150 may also select the type of fuel for the combustor 130. Additionally, the fuel controller 150 may also generate and implement fuel split commands that determine portions of fuel flowing to various fuel circuits (rings) of the combustor 130. The fuel split commands may correspond to a fuel split percentage for each fuel circuit, which defines what percentage of the total amount of fuel delivered to the combustor 130 is supplied through a particular fuel circuit. It should be appreciated that the fuel controller 150 may be implanted separately from the controller 400 or as an integrated component of the controller 400.

According to further embodiments of the disclosure, the operation of the engine 110 may be monitored by one or more sensors 160 detecting various conditions of the engine 110 and sensing parameters of the environment. For example, temperature sensors may monitor an ambient temperature surrounding the engine 110, a compressor discharge temperature, a turbine exhaust gas temperature (EGT), and perform other temperature measurements. Pressure sensors may monitor an ambient pressure and static and dynamic pressure levels at the compressor inlet and outlet, and a turbine exhaust, as well as at other locations in the gas stream. Furthermore, humidity sensors (e.g., wet and dry bulb thermometers) may measure an ambient humidity in the inlet duct of the compressor. The sensors may also include flow sensors, speed sensors, flame detector sensors, valve position sensors and guide vane angle sensors that sense various parameters pertinent to the operation of the engine 110. As used herein, the term "operational conditions" can include fuel splits, loads, and other conditions applied to turbine operation, while "operational data" and similar terms can include items that can be used to define the affecting parameters of the engine 110, such as temperatures, pressures, and flows at defined locations in the engine 110 that can be used to represent dependencies between reference conditions and the engine response. In certain example embodiments, emission sensors may be provided to measure emissions levels in a turbine exhaust and provide feedback data used by control algorithms. For example, emissions sensors at the turbine exhaust provide data on current emissions levels that may be applied in determining a turbine exhaust temperature request.

In some embodiments, controller 400 may modulate staging valves 170 and compressor bleeds 180 as a function of flame temperature schedules. The flame temperature schedules can be modified and saved on site, for example in a memory of the controller 400. The flame temperature schedules can be used to ensure emission requirements for the engine. Due to the change in ambient conditions, changes and/or minor damages inside the engine's turbine, and engine's compressor, the flame temperature schedules mapped at given ambient conditions may not produce acceptable behavior of the engine when the ambient conditions, fuel quality, and/or state of engine are changed. This may result in partial or total flameouts of the combustor, thereby causing engine trips. For example, the controller 400 may be operable to detect that one or more rings in the combustor is cold (partial flameout) by changing fuel flows between the rings. Upon determination that the engine has had a partial flameout, the controller may be operable to carry out a correcting action by changing fuel split between the rings. In order to maintain the same flame temperature and keep the engine producing the same amount of power, the controller 400 may increase fuel flow to one or more rings. In order to match an extra amount of fuel, an air flow to the combustor can also be increased by closing the compressor bleeds. In some situations, increasing air flow into the combustor may propagate partial flameout (when one or a few of the rings in the combustor are not lit) to total flameout (when all of the rings in the combustor are not lit).

In various embodiments of the disclosure, upon determining the partial flameout, the controller 400 may be operable to carry out a different correcting action. Instead of merely redistributing fuel flow between the rings, the controller can be operable to raise a bulk flame temperature. The bulk flame temperature can be determined as the calculated weighted average of a total fuel flow, a total air flow and a computed flame temperature for all rings in the combustor, wherein the rings have different sizes: small, medium and large. Raising the bulk flame temperature may force the compressor bleeds to open up instead of close down. As a result of opening up the combustor rings, the air flow is reduced, thereby preventing the engine from experiencing a total flameout and may even bring the engine from a partial flameout to a fully lit condition.

In some embodiments, to maintain the bulk flame temperature and to keep all rings lit, the controller 400 may be operable to monitor an EGT. During an engine's operation in a given burning mode, for example, an ABC mode when all rings are lit, the controller may bias the bulk flame temperature and modulate the compressor bleeds to maintain a target EGT for the given burning mode of the combustor. Modulating compressor bleeds to maintain the target EGT may allow keeping emissions of the engine in a desired range and keeping the engine from partial flameouts. This approach may also eliminate the need for remapping combustor flame temperature schedules according to seasonal changes of ambient conditions and/or changes in the state of the engine due to minor damages in the engine's turbine, combustor, and the so on.

The technology described herein may also reduce the occurrence of flameout or combustor acoustics due to switching to a different source of fuel used by the engine, especially when the fuel has a different heating value. Usually, there is a time period (e.g., about 6 minutes) before the controller 400 can receive updated information on the heating value of the fuel from a gas chromatograph. During this time period, the engine may experience partial flameouts and combustor acoustics if the heating value of the fuel is changed from a higher value to a lower value and the controller is not aware of this change in fuel. The controller may monitor the EGT and when the EGT drops down from a target value due to the change in fuel quality, it may raise the bulk flame temperature schedule, thereby forcing the combustor bleeds to open up. This may allow the engine to operate normally during the time period from the moment when the fuel quality is changed to the moment when the controller receives the updated heating value of the fuel.

In some embodiments, the controller 400 may be configured to monitor the physical core speed of a turbine spool and switch the engine from running in a higher burning mode to a lower burning mode when the core speed reaches a pre-determined core speed limit. The core speed limit can be determined based on a burning mode and correlated to a high pressure compressor temperature. Usually, the core speed may increase to the core speed limit at cold ambient conditions, for example, when the ambient temperature drops below about 0 degrees Fahrenheit. In certain embodiments, when the core speed is about to reach the core speed limit, the controller is operable to decrease the fuel flow rapidly to ensure that the core speed does not exceed the core speed limit. This may derate the engine down to a next burner mode, for example from the ABC mode, where all three rings are lit, to an AB mode, where only two rings are lit. To avoid the core speed to run at the core speed limit, the controller 400 may be configured to reduce bulk flame temperature and, in turn, close the compressor bleeds. Closing the bleeds may cause lowering the core speed and, as a result, preventing the core speed from running at the core speed limit.

Figure 2:
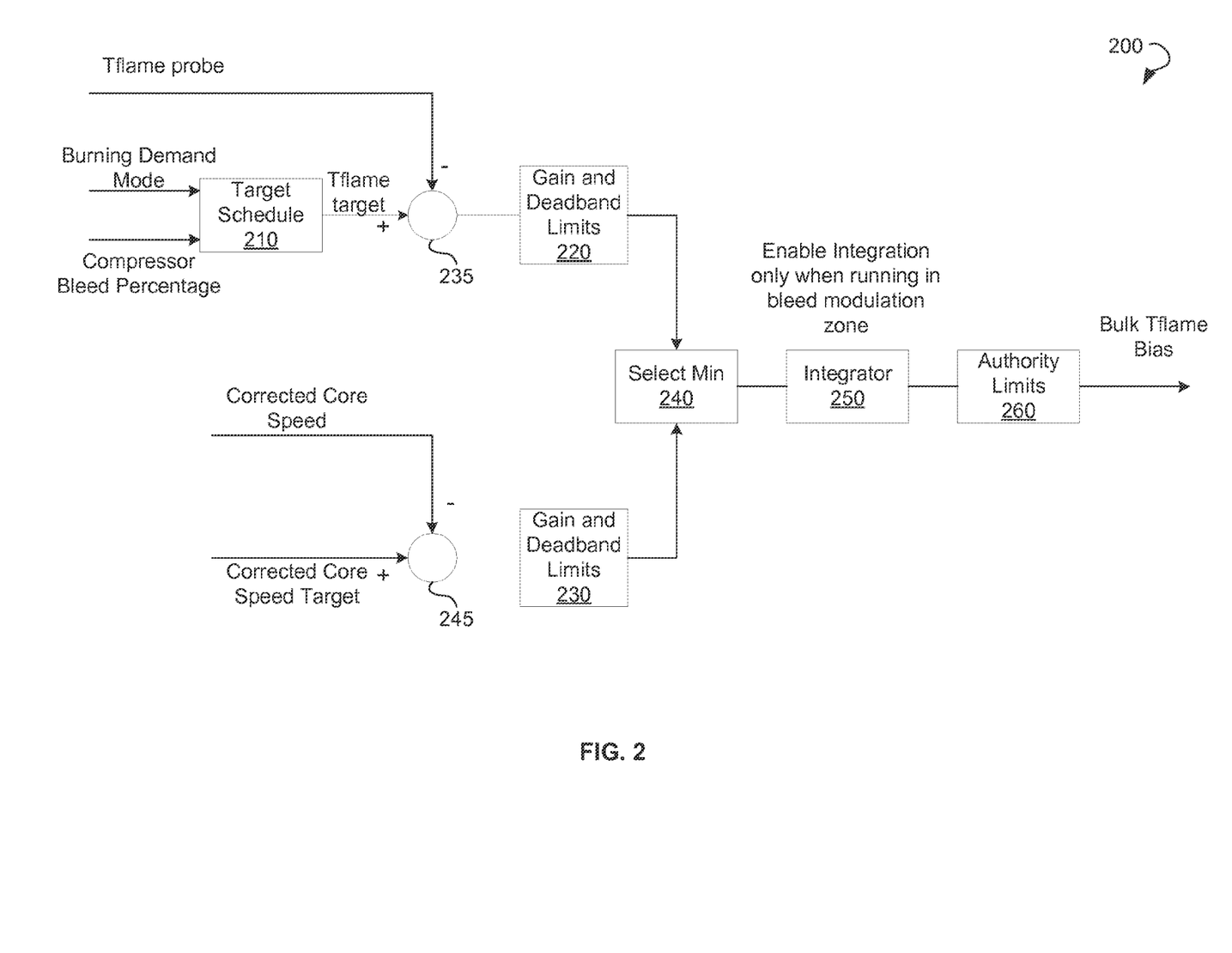
FIG. 2 depicts a block diagram illustrating a controller for regulating a bulk flame temperature according to an embodiment of the disclosure.

FIG. 2 illustrates a controller 200 for regulating bulk flame temperature in an engine, according to an example embodiment. The example controller 200 may include a target schedule module 210, summation modules 235 and 245, gain and deadband limits modules 220 and 230, a minimum selection module 240, an integrator module 250, and an authority limits module 260. In some embodiments, the controller 200 may have fewer or different modules necessary for operation of the controller 200. For example, in some embodiments, modules 245 and 230 can be optional, and the controller 200 can be operable to regulate the bulk flame temperature based only on EGT input. Alternatively, in other embodiments, modules 210, 235, and 220 may be optional and the controller 200 may be operable to regulate bulk flame temperature based only on a core speed. In the example shown in FIG. 2, the controller 200 is operable to regulate the bulk flame temperature based on both EGT and core speed. In some embodiments, the controller 200 for regulating bulk flame temperature may be communicatively coupled to the controller 400. In other embodiments, the modules of the controller 200 may be integrated in the controller 400.

The target schedule module 210 can be configured to determine a target EGT value for a current burning mode demand and a compressor bleed percentage. In some embodiments, the burner demand includes a number from 0 to 15 describing which of three rings are burning. The burner demand may include a top burner mode when all three rings are lit. The compressor bleed percentage is a normalized number from 0 to 100%. The total amount of the allowed air flow can depend on the burning mode demand.

Summation module 235 can be configurable to receive actual (feedback) EGT from a probe, the target EGT from the module 210, and calculate a difference between the target EGT and the actual EGT. The difference can be provided to gain and deadband limits module 220. The module 220 can be configurable to determine a first error value for a bulk flame temperature based on the difference between the target and actual EGT and pre-determined deadband limits and gain.

The summation module 245 can be configurable to receive corrected core speed, corrected core speed target, and calculate a difference between the corrected core speed target and the corrected core speed. The difference can be provided to the gain and deadband limits module 230 to determine a second error value for a bulk flame temperature based on the difference between the core speed and the core speed target. The second error value can provide a margin preventing the core speed from reaching the core speed target when applying a bias to the bulk flame temperature.

The minimum selection module 240 can be configurable to receive the first error value from module 220 and the second error value from module 230 and, based on the received values, determine a minimal error value acceptable to correct the bulk flame temperature. The selection of the minimal error value can be carried out in order to avoid applying too large of a bias to the bulk flame temperature such that it would cause the corrected core speed to reach the corrected core speed target, and as result, switch the engine to a lower burning mode.

The integrator module 250 can be configurable to receive the minimal error value from the minimum selection module 240 and integrate it to bias for the bulk flame temperature. In some embodiments, the minimal error value can be integrated to bias only when the engine is running in a compressor bleed modulation mode. The bias for the bulk flame temperature can be provided via the authority limits module 260 to further the modules of the controller 400 for applying the bias to the bulk flame temperature schedules.

Figure 3:
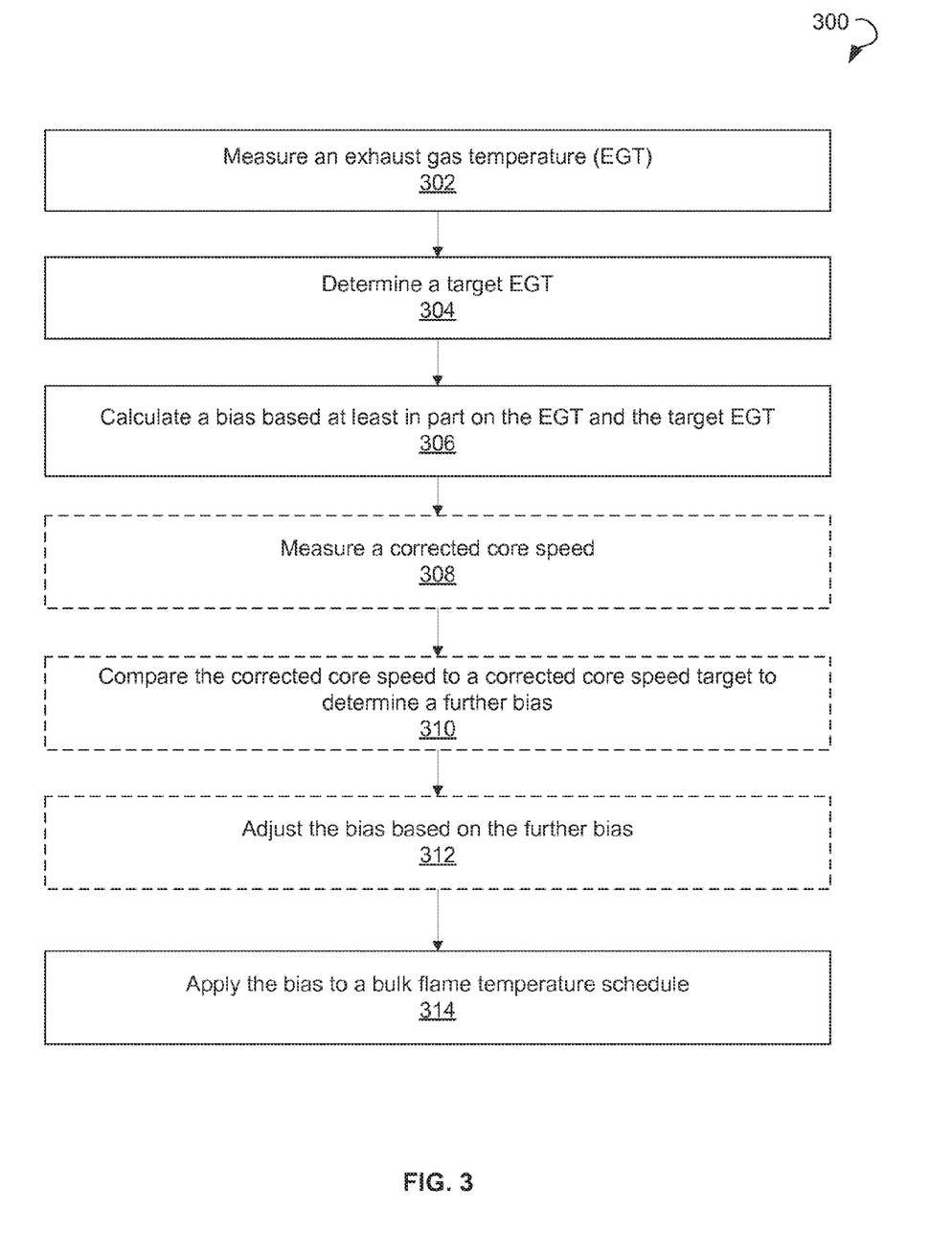
FIG. 3 is a flow chart illustrating a method for regulating a bulk flame temperature according to an embodiment of the disclosure.

FIG. 3 depicts a method 300 for regulating a bulk flame temperature in an engine, according to an example embodiment. The example method 300 may be implemented in the engine 110 described with reference to FIG. 1 above using a controller 200 described with reference to FIG. 2 above. The method 300 may commence at operation 302 with measuring an EGT. At operation 304, the method 300 may include determining a target EGT. The target EGT can be determined based on a current burning mode of the engine and a compressor bleed percentage. At operation 306, the method 300 may proceed with calculating a bias to the bulk flame temperature based at least on the EGT and the target EGT.

At optional operations 308-312, the bias can be adjusted based at least on a corrected core speed. At operation 308, the method 300 may include measuring a corrected core speed. At operation 310, the method 300 may proceed with comparing the corrected core speed to a corrected core speed target to determine a further bias. The corrected core speed target can be based at least on the current burning mode and the high pressure compressor temperature. At operation 312, the method 300 may continue with adjusting the bias based on the further bias. At operation 314, the method 300 may conclude with applying the bias to a bulk flame temperature schedule.

Figure 4:
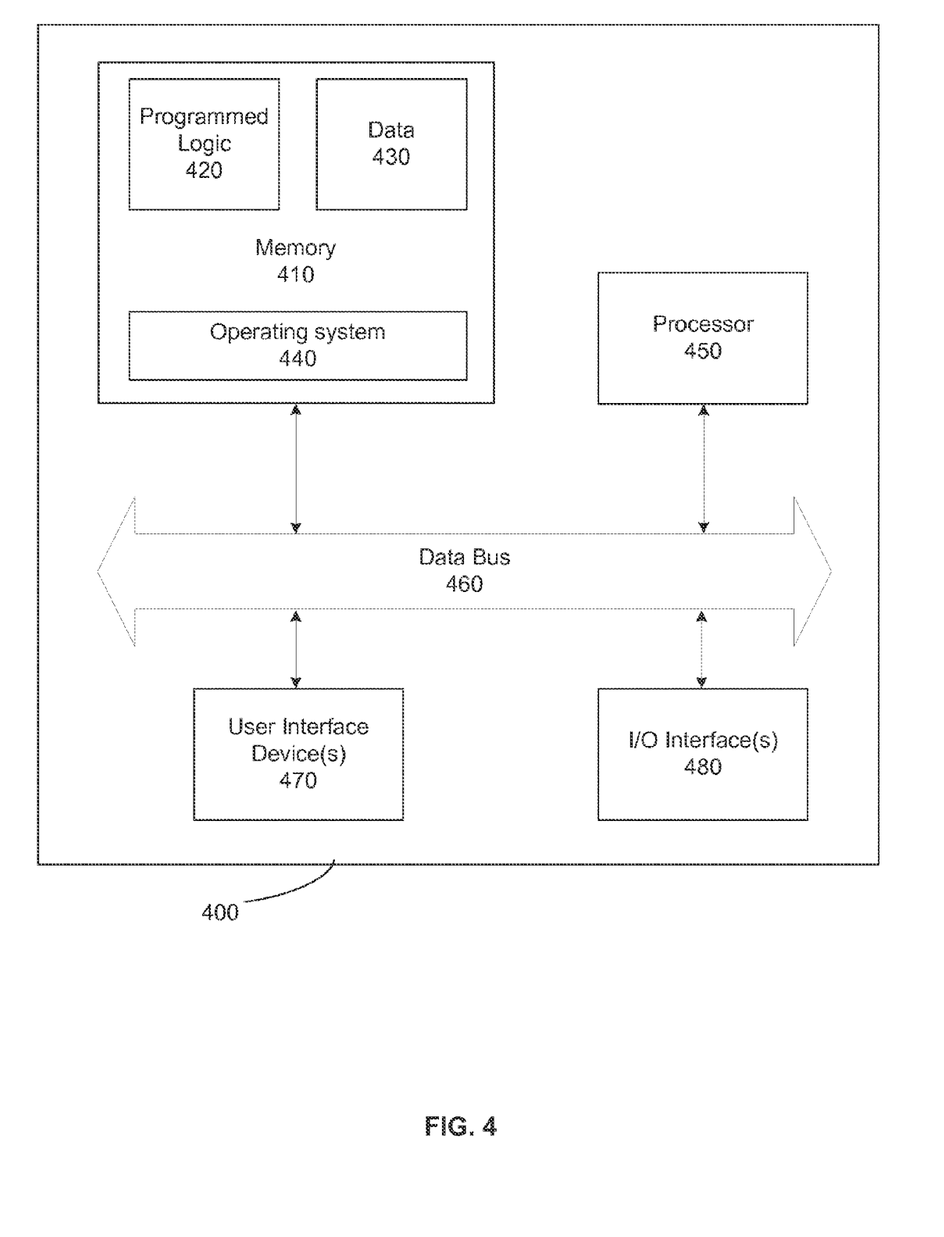
FIG. 4 is a block diagram illustrating an example controller for controlling a DLE engine, in accordance with an embodiment of the disclosure.

FIG. 4 depicts a block diagram illustrating an example controller 400 for regulating a bulk flame temperature, in accordance with an embodiment of the disclosure. More specifically, the elements of the controller 400 may be used to run a gas turbine under a plurality of operational conditions while within predetermined combustion operational boundaries, automatically collect operational data associated with the gas turbine while the gas turbine is running, store the operational data, generate a set of constants for one or more predetermined combustion transfer functions based on the operational data, and store the set of constants in the gas turbine combustion control system to be used during the commissioning of the gas turbine. The controller 400 may include a memory 410 that stores programmed logic 420 (e.g., software) and may store data 430, such as operational data associated with the gas turbine, the set of constants, and the like. The memory 410 also may include an operating system 440.

A processor 450 may utilize the operating system 440 to execute the programmed logic 420, and in doing so, may also utilize the data 430. A data bus 460 may provide communication between the memory 410 and the processor 450. Users may interface with the controller 400 via at least one user interface device 470, such as a keyboard, mouse, control panel, or any other device capable of communicating data to and from the controller 400. The controller 400 may be in communication with the gas turbine combustion control system online while operating, as well as in communication with the gas turbine combustion control system offline while not operating, via an input/output (I/O) interface 480. Additionally, it should be appreciated that other external devices or multiple other gas turbines or combustors may be in communication with the controller 400 via the I/O interface 480. In the illustrated embodiment, the controller 400 may be located remotely with respect to the gas turbine; however, it may be co-located or even integrated with the gas turbine. Further, the controller 400 and the programmed logic 420 implemented thereby may include software, hardware, firmware, or any combination thereof. It should also be appreciated that multiple controllers 400 may be used, whereby different features described herein may be executed on one or more different controllers 400.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method for regulating a bulk flame temperature in a dry low emission (DLE) engine, the method comprising:
measuring an exhaust gas temperature (EGT);
determining a target EGT;
calculating a first bias based at least in part on the measured EGT and the target EGT; and
applying the first bias to a bulk flame temperature schedule, and
prior to applying the first bias to the bulk flame temperature schedule;
measuring a corrected core speed;
comparing the corrected core speed to a core speed target to determine a further bias; and
adjusting the first bias based at least in part on the further bias.

2. The method of claim 1, further comprising regulating one or more staging valves and compressor bleeds associated with the DLE engine based at least in part on the bulk flame temperature schedule.

3. The method of claim 2, wherein the bulk flame temperature schedule is mapped to parameters of the one or more staging valves and compressor bleeds to reduce nitric oxide and nitrogen dioxide (NOx) and carbon monoxide (CO) emissions.

4. The method of claim 1, wherein the target EGT is determined based at least in part on a compressor air flow percentage and a combustor burning mode.

5. The method of claim 1, wherein the first bias is applied to the bulk flame temperature schedule when the DLE engine is running in a bleed modulation mode.

6. The method of claim 1, wherein the corrected core speed target is determined based at least in part on a combustor burning mode.

7. The method of claim 6, further comprising:
determining that the corrected core speed is equal or greater than the core speed target; and
based on the determination, selectively switching the DLE to a lower combustor burning mode.

8. The method of claim 1, wherein the further bias is determined to prevent the corrected core speed from reaching the core speed target.

9. The method of claim 1, wherein adjusting the first bias includes selecting a minimal value from the first bias and the further bias.

10. A system for regulating a bulk flame temperature in a dry low emission (DLE) engine, the system comprising:
a processor;
a memory communicatively coupled to the processor, the memory storing instructions which when executed by the processor perform operations comprising:
measuring an exhaust gas temperature (EGT);
determining a target EGT;
calculating a first bias based at least in part on the measured EGT and the target EGT; and
applying the first bias to a bulk flame temperature schedule, and
prior to applying the first bias to the bulk flame temperature schedule;
measuring a corrected core speed;
comparing the corrected core speed to a core speed target to determine a further bias; and
adjusting the first bias based at least in part on the further bias.

11. The system of claim 10, wherein the processor is operable to control one or more staging valves and compressor bleeds associated with the DLE engine based at least in part on the bulk flame temperature schedule.

12. The system of claim 11, wherein the bulk flame temperature schedule is mapped to parameters of the one or more staging valves and compressor bleeds to reduce nitric oxide and nitrogen dioxide (NOx) and carbon monoxide (CO) emissions.

13. The system of claim 10, wherein the target EGT is determined based at least in part on a compressor air flow percentage and a combustor burning mode.

14. The system of claim 10, wherein the first bias is applied to the bulk flame temperature schedule when the DLE engine is running in a bleed modulation mode.

15. The system of claim 10, wherein the corrected core speed target is determined based at least in part on a combustor burning mode.

16. The system of claim 15, further comprising:
determining that the corrected core speed is equal or greater than the core speed target: and
based on the determination, selectively switching the DLE to a lower combustor burning mode.

17. The system of claim 10, wherein the further bias is determined to prevent the corrected core speed from reaching the core speed target.

18. A non-transitory computer-readable medium having stored instructions, which when executed by one or more processors, perform operations comprising:
measuring an exhaust gas temperature (EGT);
determining a target EGT;
calculating a first bias based at least on the measured EGT and the target EGT;
measuring a corrected core speed;
comparing the corrected core speed to a core speed target to determine a further bias;
adjusting the first bias based at least in part on the further bias; and
applying the first bias to a bulk flame temperature schedule.

* * * * *